United States Patent
Zhou et al.

(10) Patent No.: US 9,215,246 B2
(45) Date of Patent: Dec. 15, 2015

(54) WEBSITE SCANNING DEVICE AND METHOD

(75) Inventors: Da Zhou, Beijing (CN); Xiaoming Wang, Beijing (CN); Ming Lv, Beijing (CN); Hui Jiang, Beijing (CN); Guangxu Liu, Beijing (CN); Xiaohai Lu, Beijing (CN); Na Li, Beijing (CN); Xing Ye, Beijing (CN)

(73) Assignee: NSFOCUS INFORMATION TECHNOLOGY CO., LTD., Beijing (CN)

( * ) Notice: Subject to any disclaimer, the term of this patent is extended or adjusted under 35 U.S.C. 154(b) by 207 days.

(21) Appl. No.: 13/878,955

(22) PCT Filed: Oct. 21, 2011

(86) PCT No.: PCT/CN2011/001755
§ 371 (c)(1),
(2), (4) Date: Jun. 27, 2013

(87) PCT Pub. No.: WO2012/051802
PCT Pub. Date: Apr. 26, 2012

(65) Prior Publication Data
US 2013/0276126 A1      Oct. 17, 2013

(30) Foreign Application Priority Data
Oct. 22, 2010   (CN) .......................... 2010 1 0522435

(51) Int. Cl.
G06F 21/00    (2013.01)
H04L 29/06    (2006.01)
G06F 21/57    (2013.01)
G06F 21/62    (2013.01)
H04L 29/08    (2006.01)

(52) U.S. Cl.
CPC .......... *H04L 63/1433* (2013.01); *G06F 21/577* (2013.01); *G06F 21/6209* (2013.01); *H04L67/02* (2013.01); *G06F 2221/2119* (2013.01); *H04L 63/1483* (2013.01); *H04L 63/168* (2013.01)

(58) Field of Classification Search
CPC .................................................... H04L 63/1433
See application file for complete search history.

(56) References Cited

U.S. PATENT DOCUMENTS 7,958,555 B1 *   6/2011   Chen et al. ...................... 726/22
2008/0172741 A1 *  7/2008   Reumann et al. ............... 726/23

FOREIGN PATENT DOCUMENTS

CN    101582887         11/2009
CN    101626368 A        1/2010
(Continued)

OTHER PUBLICATIONS

Lei, Min, International Search Report for PCT/CN2011/001755 as mailed Feb. 16, 2012, 2 pages.

*Primary Examiner* — Ellen Tran
*Assistant Examiner* — Helai Salehi
(74) *Attorney, Agent, or Firm* — Winstead PC

(57) ABSTRACT

The invention discloses a website scanning apparatus for performing a security vulnerability scanning on a target website, which apparatus comprises: a web page obtaining component obtaining current content and/or features of a web page corresponding to a link to be processed; a link processing component including a change judgment device for judging whether the web page corresponding to the link to be processed has been changed based on stored web page content and/or features corresponding to the link to be processed as well as the current web page content and/or features of the link to be processed; and a vulnerability detecting component for performing a security vulnerability detection on a web page corresponding to a link to be processed for which the web page has been changed. The invention also discloses a website scanning method corresponding thereto.

13 Claims, 4 Drawing Sheets

(56) References Cited

FOREIGN PATENT DOCUMENTS

| CN | 101656710 | | 2/2010 |
|---|---|---|---|
| JP | 2003-337797 | A | 11/2003 |
| JP | 2007-065810 | A | 3/2007 |
| JP | 2008-165292 | A | 7/2008 |
| JP | 2008-171101 | A | 7/2008 |

* cited by examiner

WEBSITE SCANNING DEVICE AND METHOD

FIELD OF THE INVENTION

The invention relates to the field of computer network security, and in particular, to a website scanning apparatus and method for remotely scanning a website to determine whether there is a security vulnerability at the website.

BACKGROUND OF THE INVENTION

To judge whether there are such kinds of security vulnerabilities as a CGI vulnerability, an SQL injection vulnerability, a cross-site scripting vulnerability, etc. at a website, it is necessary to perform a security vulnerability scanning for the website from outside the website, namely, remotely, to determine whether there are such security vulnerabilities at the website.

Conventional methods for scanning a website vulnerability are to traverse in turn all the pages on a website, call a crawler program for every page to obtain the page content to perform an analysis, in order to perform a comprehensive vulnerability scanning. That is to say, current web page scanning technologies all employ a full vulnerability scanning mode, and even when it is necessary to perform multiple vulnerability scanning on a target website, the scanning at each time is a full vulnerability scanning.

There are the following problems with respect to performing a full vulnerability scanning on a website: since the number of web pages in a common network application is very large, and the amount of communication data required to be sent and received for performing a vulnerability scanning on each web page is great, the bandwidth being occupied by the scanning is also great; furthermore, due to the large number of web pages, it takes a long time to perform a full scanning on the website. The requests sent for performing a security vulnerability scanning on a website are all processed by a network server of the website, and if full vulnerability scanning is performed on the website too frequently, the network server will undergo an increased pressure to process the requests, thereby affecting a normal access to the website.

For each web page, if the content of the web page is not changed, there is little possibility for the web page changing from being safe into unsafe. If this point may be taken into account to reduce security vulnerability scanning on a web page whose content is not changed, this may reduce the processing pressure of a website caused by performing a vulnerability scanning on the one hand, but also improve the efficiency and speed of the vulnerability scanning on the other hand.

What is desired is to provide a vulnerability scanning apparatus as well as a vulnerability scanning method which can reduce the processing pressure of a target website caused by performing a security vulnerability scanning while improving performance.

SUMMARY OF THE INVENTION

In view of the above problems, the invention is proposed to provide a website scanning apparatus as well as a website scanning method which overcomes the above problems or at least in part solves or mitigates the above problems.

According to an aspect of the invention, there is provided a website scanning apparatus for performing a security vulnerability scanning on a target website, which apparatus comprises: a web page obtaining component obtaining current web page content and/or features of a web page corresponding to a link to be processed at the target website; a link processing component for processing the link to be processed, wherein the link processing component comprises a change judgment device for judging whether the web page corresponding to the link to be processed has been changed based on stored web page content and/or features corresponding to the link to be processed as well as the current web page content and/or features obtained by the web page obtaining component; and a vulnerability detecting component for performing a security vulnerability detection on a web page corresponding to a link to be processed for which the corresponding web page is judged by the change judgment device to have been changed.

According to another aspect of the invention, there is provided a website scanning method for a target website comprising the steps of: obtaining a link to be processed at the target website; obtaining previous web page content and/or features of a web page entry corresponding to the link to be processed from a collection of web pages stored for the target website, obtaining current web page content and/or features corresponding to the link to be processed, and judging whether the web page corresponding to the link to be processed has been changed by comparing the previous web page content and/or features with the current web page content and/or features; and performing a security vulnerability detection on a web page corresponding to the link to be processed if the web page has been changed.

The website scanning apparatus and the website scanning method according to the invention take full advantage of the result of a previous scanning and perform a security vulnerability scanning again only on a web page that has been changed after the previous scanning, thereby increasing the efficiency and speed of website scanning by the website scanning apparatus, and reducing an additional server load of the target website caused by the security vulnerability scanning.

BRIEF DESCRIPTION OF THE DRAWINGS

Various other advantages and benefits will become apparent to those of ordinary skills in the art by reading the following detailed description of the preferred embodiments. The drawings are only for the purpose of showing the preferred embodiments, and are not considered to be limiting to the invention. And throughout the drawings, like reference signs are used to denote like components. In the drawings.

DETAILED DESCRIPTION OF THE INVENTION

In the following the invention will be further described in connection with the drawings and the particular embodiments. Before a detailed description of the embodiments, it is to be noted that in the invention, a URL and a web page link have the same meaning, both indicating a link pointing to a web page at a certain website, and a user may obtain the content of a web page pointed to by a web page link by entering the link into various network browsers or client applications. Furthermore, a web page refers to the content provided in response to a web page link request, which may be generated dynamically by a network server in a website, or reside statically in the network server.

Figure 1:
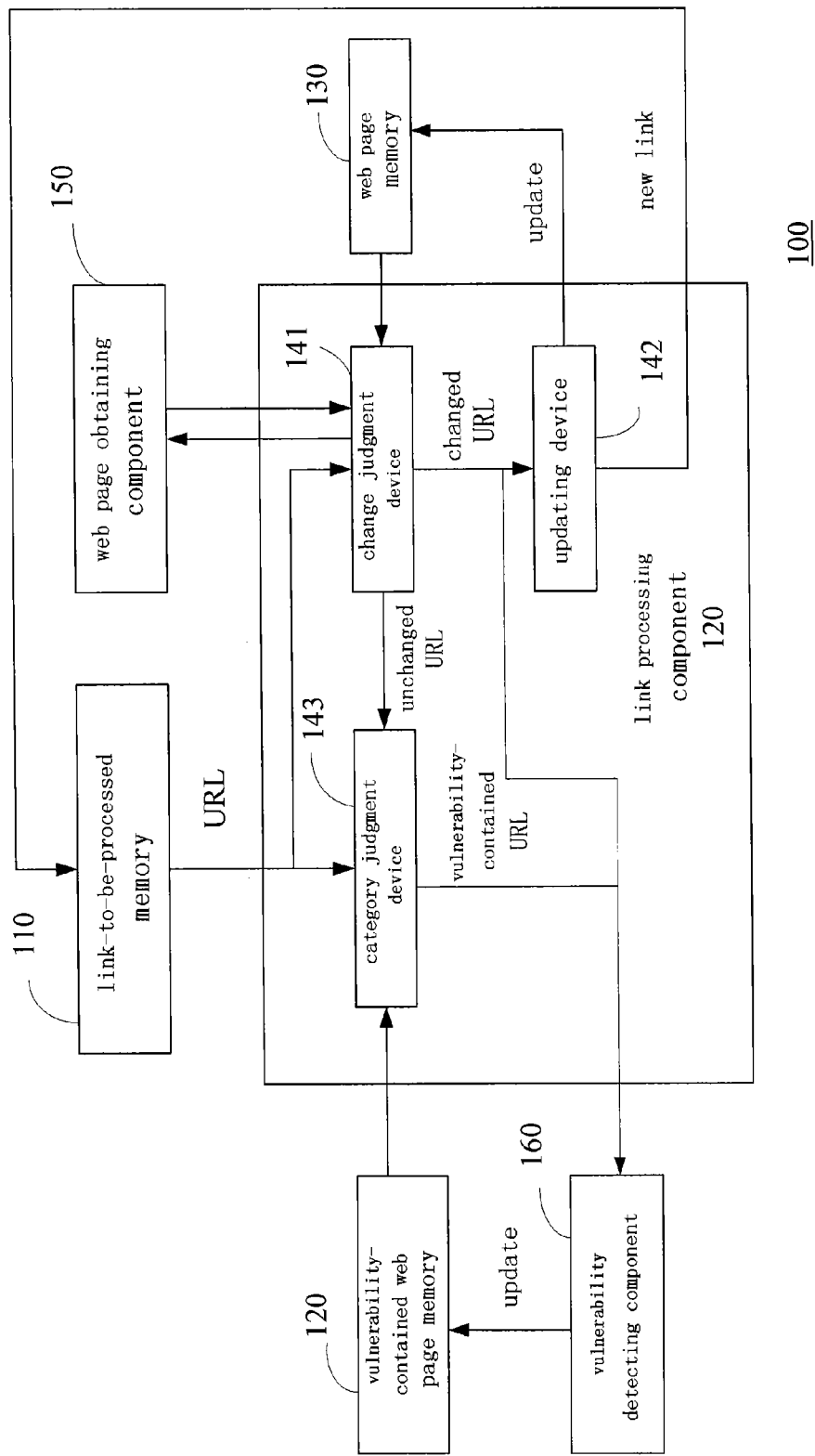
FIG. 1 shows schematically a block diagram of a website scanning apparatus according to an embodiment of the invention.

FIG. 1 shows a block diagram of a website scanning apparatus 100 according to an embodiment of the invention. As shown in FIG. 1, the website scanning apparatus 100 comprises a link-to-be-processed memory 110, and in the link-to-be-processed memory 110 is stored a collection of links to be processed at a target website which will be processed by the website scanning apparatus 100, each entry in the collection of links to be processed being a link to be processed. Optionally, the website scanning apparatus 100 further comprises a vulnerability-contained web page memory 120 and a web page memory 130. In the vulnerability-contained web page memory 120 is stored a collection of web pages which are determined by the website scanning apparatus 100 to have contained a vulnerability in a previous scanning. The vulnerability-contained web page memory 120 may, for each web page determined to have contained a vulnerability, store its URL (link) and an associated vulnerability feature (e.g., vulnerability code, vulnerability type, vulnerability severity, etc.). The web page memory 130 stores a collection of web pages at the target website obtained by a previous scanning. Optionally, the web page memory 130 may, for each web page at the target website, store its URL, web page content and/or web page feature. Here, the web page feature comprises at least one of the following content: the time at which the page is last modified, the page effective time duration, the time at which the page is generated on the server side, the page identification (e.g., the ETag attribute), the page structure, the page content length, the number of times that the page has been accessed, etc. The web page feature is an important basis for judging whether a web page has been changed, therefore the invention is not limited to the various particular features listed above, and a variety of features related with a page which may be used for judging whether the page has been changed all fall within the protection scope of the invention. However, it may require too much memory space to store the web page content for each web page. Optionally, the web page memory 130 may, for each web page, store the MD5 value of the web page instead of the whole web page content.

The website scanning apparatus 100 comprises a web page obtaining component 150, which receives a link from which a web page will be obtained, and obtains web page content and/or features corresponding to the link from a network. The web page obtaining component 150 may employ any technology commonly used in the art to implement its functions, for example, various commonly used network crawler technologies currently, etc.

The website scanning apparatus 100 comprises a link processing component 140, which receives from the link-to-be-processed memory 110 a link to be processed for processing. In particular, the link processing component 140 judges whether the web page content corresponding to the link to be processed has been changed. If the web page content has been changed, the web page that has been changed is sent to a vulnerability detecting component 160 for performing a vulnerability detection. Optionally, the link processing component also utilizes the changed web page content and features to update previously stored web page content and/or features corresponding to the link to be processed, and updates the collection of links to be processed in the link-to-be-processed memory 110 according to links pointing to other web pages contained in the changed web page. Furthermore, the link processing component 140 may also judge whether the web page corresponding to the link has been determined previously to have contained a vulnerability with reference to the collection of vulnerability-contained web pages stored in the vulnerability-contained web page memory 120, and if it has been determined previously to have contained a vulnerability, the link and/or the web page corresponding to the link is sent to the vulnerability detecting component 160 for performing a vulnerability detection again.

Optionally, the link processing component 140 performs a judgment on whether the web page has been determined previously to have contained a security vulnerability only when the web page content has not been changed. Further, optionally, a judgment is performed on whether the web page content has been changed only when the web page has been determined previously not to have contained a security vulnerability.

According to an embodiment of the invention, the link processing component 140 comprises a change judgment device 141. The change judgment device 141 receives a link to be processed, and obtains from the web page memory 130 web page content and/or features of a previously stored web page corresponding to the link. If a web page corresponding to the link does not exist in the web page memory 130, the link belongs to a new link. On the contrary, if a previously stored web page corresponding to the link exists in the web page memory 130, i.e. the link belongs to an existing link, the change judgment device 141 utilizes the web page obtaining component 150 to obtain current web page content and/or features of a web page corresponding to the link, judges whether the obtained current web page content and/or features are identical to the stored web page content and/or features, and if not identical, concludes that the web page corresponding to the link has been changed, i.e. the link belongs to a changed link. Since a web page corresponding to a new link or a changed link has been changed, it is necessary to perform a security vulnerability scanning again on the changed web page, and therefore the change judgment device 141 also sends the new or changed link to the vulnerability detecting component 160 for performing a vulnerability detection.

It is to be noted that, though a new link and a changed link are indicated above respectively, both the links belong to such a link for which the current content of the corresponding web page has not been scanned previously, and hence in the following both will not be distinguished between and collectively referred to as a changed link.

It is to be noted that, as described above, a web page feature is an important basis for judging whether a web page has been changed. Therefore, when it is judged whether a web page corresponding to an existing link has been changed, it may be unnecessary to obtain the web page content, but only obtain a web page feature of the web page, thereby saving the network bandwidth. In addition, when it is judged whether a web page has been changed based on the web page content, if in the web page memory 130 is stored the MD5 value of a web page, it is also necessary to compute the MD5 value corresponding to the obtained web page content, and judge whether the web page has been changed by comparing whether the two MD5 values are equal.

The vulnerability detecting component 160 receives from the link processing component 140 a link for which a security vulnerability scanning will be performed, for example, a new link or a changed link determined by the change judgment device 141, for processing. Optionally, the vulnerability detecting component 160 may also receive from the link processing component 140 web page content of a web page corresponding to the link, or the vulnerability detecting component 160 may utilize by itself the web page obtaining component 150 to obtain related web page content. The vulnerability detecting component may utilize any security vulnerability detecting technology in the art to perform a vulnerability detection on the web page, thereby obtaining the result of vulnerability detection. Optionally, the result of vulnerability detection comprises whether in the web page exist a vulnerability and an associated vulnerability feature (e.g., vulnerability code, vulnerability type, vulnerability severity, etc.). Subsequently, the vulnerability detecting component 160 updates the collection of web pages stored in the vulnerability-contained web page memory 120 which contain a vulnerability according to the result of vulnerability detection. In particular, in the case where in the collection of web pages which contain a vulnerability exists a web page entry corresponding to the link processed by the vulnerability detecting component 160, if a newly obtained result of vulnerability detection shows that the result of a current scanning indicates that the web page entry still contains a security vulnerability, the newly obtained result of vulnerability detection is used to update the corresponding entry in the collection; on the contrary, if a new result of vulnerability detection indicates that the web page entry does not contain a security vulnerability any more, the related entry is deleted from the collection. Whereas in the case where in the collection of web pages which contain a vulnerability a web page entry corresponding to the link processed by the vulnerability detecting component 160 does not exist, when a newly obtained result of vulnerability detection shows that the result of a current scanning indicates that the web page content contains a security vulnerability, the web page and the result of vulnerability detection are added into the collection.

Optionally, the link processing component 140 may comprise an updating device 142. The updating device 142 obtains from the change judgment device 141 a new or changed link, utilizes the web page obtaining component 150 to obtain web page content and/or features corresponding to the link, and updates a corresponding web page entry in the collection of web pages in the web page memory 130 (if the link is a new link, a web page entry corresponding to the link is added into the collection of web pages). Furthermore, if in a web page corresponding to the new or changed link is also included links to other web pages, then these links to other web pages are employed to update the collection of links to be processed in the link-to-be-processed memory 110 (namely, a link not existing in the collection of links to be processed is added into the collection of links to be processed).

Optionally, though both the change judgment device 141 and the updating device 142 in the above utilize the web page obtaining component 150 to obtain web page content and/or features corresponding to a link, for the sake of simplification, after the change judgment device 141 obtains the web page content and/or features, the obtained web page content and/or features are transmitted in association with the link between the individual devices, thereby further improving the processing performance.

Optionally, the link processing component 140 may further comprise a category judgment device 143. The category judgment device 143 receives the link to be processed, and searches for a web page entry corresponding to the link to be processed in the collection of web pages which contain a vulnerability in the vulnerability-contained web page memory 120. If the web page entry exists, the web page corresponding to the link to be processed has been judged previously to have contained a security vulnerability, and therefore a vulnerability detection is still needed to be performed, i.e., the link is sent to the vulnerability detecting component 160 for further processing. Consequently, the vulnerability detecting component also performs a security vulnerability detection on the link.

Optionally, in the link processing component 140, only the link for which the corresponding web page content is judged by the change judgment device 141 to have not been changed is sent to the category judgment device 143 for further judgment. Or, the category judgment device 143 and the change judgment device 141 may process independently, i.e., process the link received by the link processing component 140 simultaneously. Further, optionally, only the link which the category judgment device 143 determines not to contain a security vulnerability may be sent to the change judgment device 141 for further processing. All these modes are within the protection scope of the invention.

Each time the website scanning apparatus 100 performs a security scanning on a certain target website, it first utilizes a collection of web pages at the target website obtained by a previous scanning to initialize the collection of links to be processed, i.e., utilizes the link of each web page in the collection of web pages to construct the collection of links to be processed. Subsequently, the link processing component 140 processes each link to be processed in the collection of links to be processed, to complete a security vulnerability scanning on the target website once.

It may be seen that, in a website scanning apparatus according to the invention, a comprehensive security vulnerability detection is not performed on all the web pages at the target website, but a security vulnerability detection is performed only on a web page which has been determined previously to have contained a vulnerability or which has been changed since the last detection according to the result of a previous detection, thus improving the efficiency of performing a security scanning on the website and reducing the processing pressure of the target website.

Figure 2:
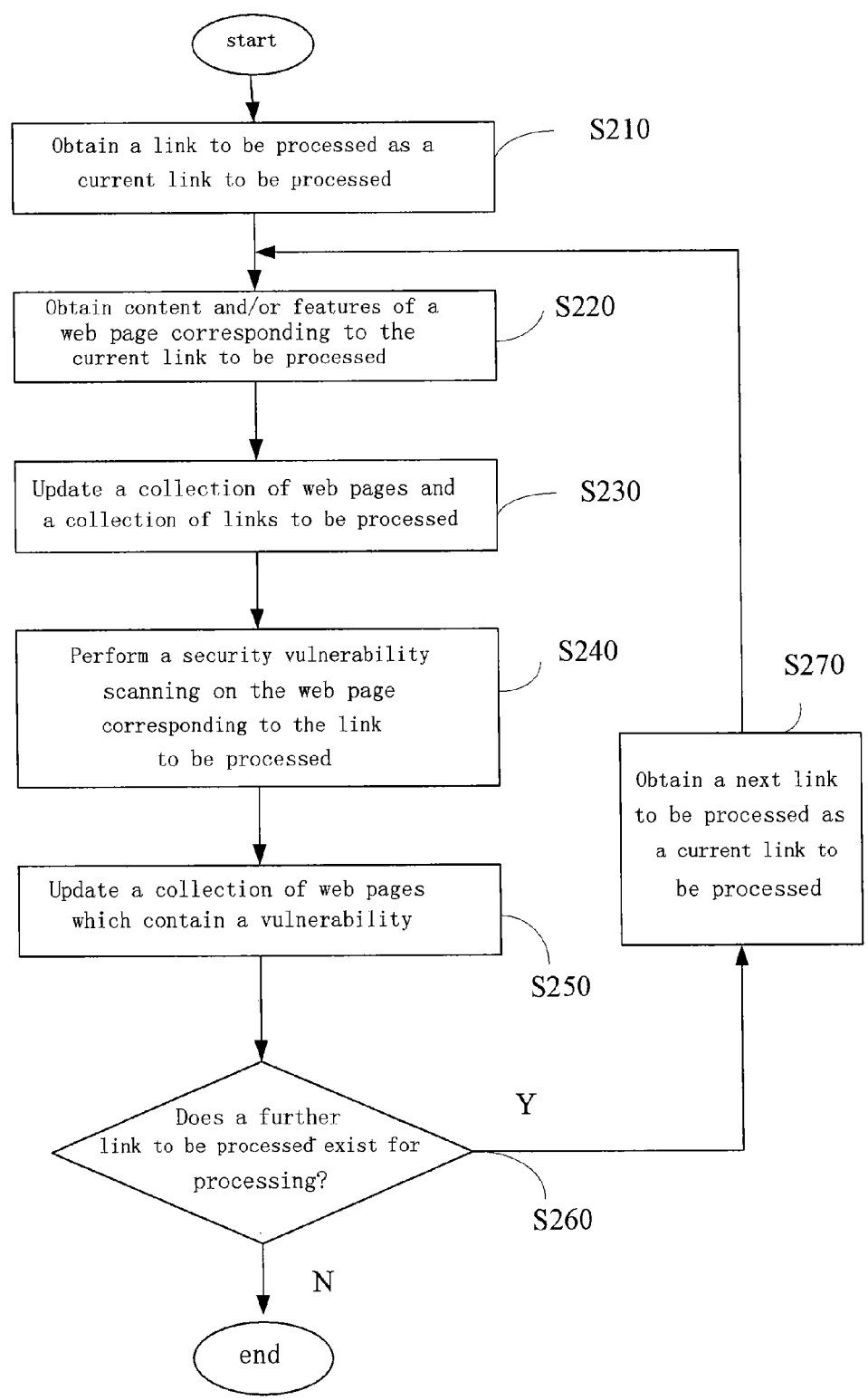
FIG. 2 shows schematically a flow chart of a method for performing a full scanning on a target website according to an embodiment of the invention.

Therefore, when a website scanning apparatus according to the invention is employed to perform a security vulnerability scanning on a target website, the steps of the procedure of a first-time scanning and the procedure of a subsequent scanning are different. FIG. 2 shows schematically a flow chart of a method for performing a full scanning on a target website according to an embodiment of the invention. The method begins at step S210, wherein a link is obtained from a collection of links to be processed (e.g., the collection of links to be processed in the link-to-be-processed memory 110) as a current link to be processed, which may be done by the link processing component 140. When the method is carried out the first time, there may be only one link to be processed in the collection of links to be processed. Subsequently, at step S220, web page content and/or features of a web page corresponding to the link to be processed are obtained as well as links to other web pages contained in the web page. This may be done by the link processing component 140 via the web page obtaining component 150, and may be done by employing various web page obtaining technologies, such as the network crawler technology. Afterwards, at step S230, the obtained web page content and/or features are added into the collection of web pages in the web page memory 130, and the links to other web pages are added into the collection of links to be processed, which may be done by the link processing component 140, in particular the updating device 142 therein. Subsequently, at step S240, a security vulnerability scanning is performed on the web page content corresponding to the link to be processed, to obtain a result of vulnerability detection. The result of vulnerability detection comprises whether in the web page exist a vulnerability and an associated vulnerability feature (e.g., vulnerability code, vulnerability type, vulnerability severity, etc.). Step S240 may be performed by employing various methods for performing a security detection on the web page content, and all these methods are within the protection scope of the invention. If the result of vulnerability detection indicates the web page contains a vulnerability, then at step S250, the web page which contains a vulnerability and its associated vulnerability features are added into the collection of web pages which contain a vulnerability in the vulnerability-contained web page memory 120. Step S240 and step S250 may be performed by the vulnerability detecting component 160.

Subsequently, at step S260, it is judged whether there is a further link to be processed in the collection of links to be processed, and if yes, a next link to be processed in the collection of links to be processed is obtained at step S270 as a current link to be processed, and the method returns to step S220 for processing. Otherwise, the full scanning method ends.

As described above, after a full scanning is performed on the target web site with the full scanning method, the collection of web pages at the target website may be obtained, which collection of web pages may also store a URL, web page content and/or web page feature for each web page. Additionally, also the collection of web pages which contain a vulnerability at the target website is obtained, wherein a URL and an associated vulnerability feature, etc (e.g., vulnerability code, vulnerability type, vulnerability severity, etc.) may be stored for each web page which contains a vulnerability. A subsequent vulnerability scanning is performed based on the two collections.

Figure 3:
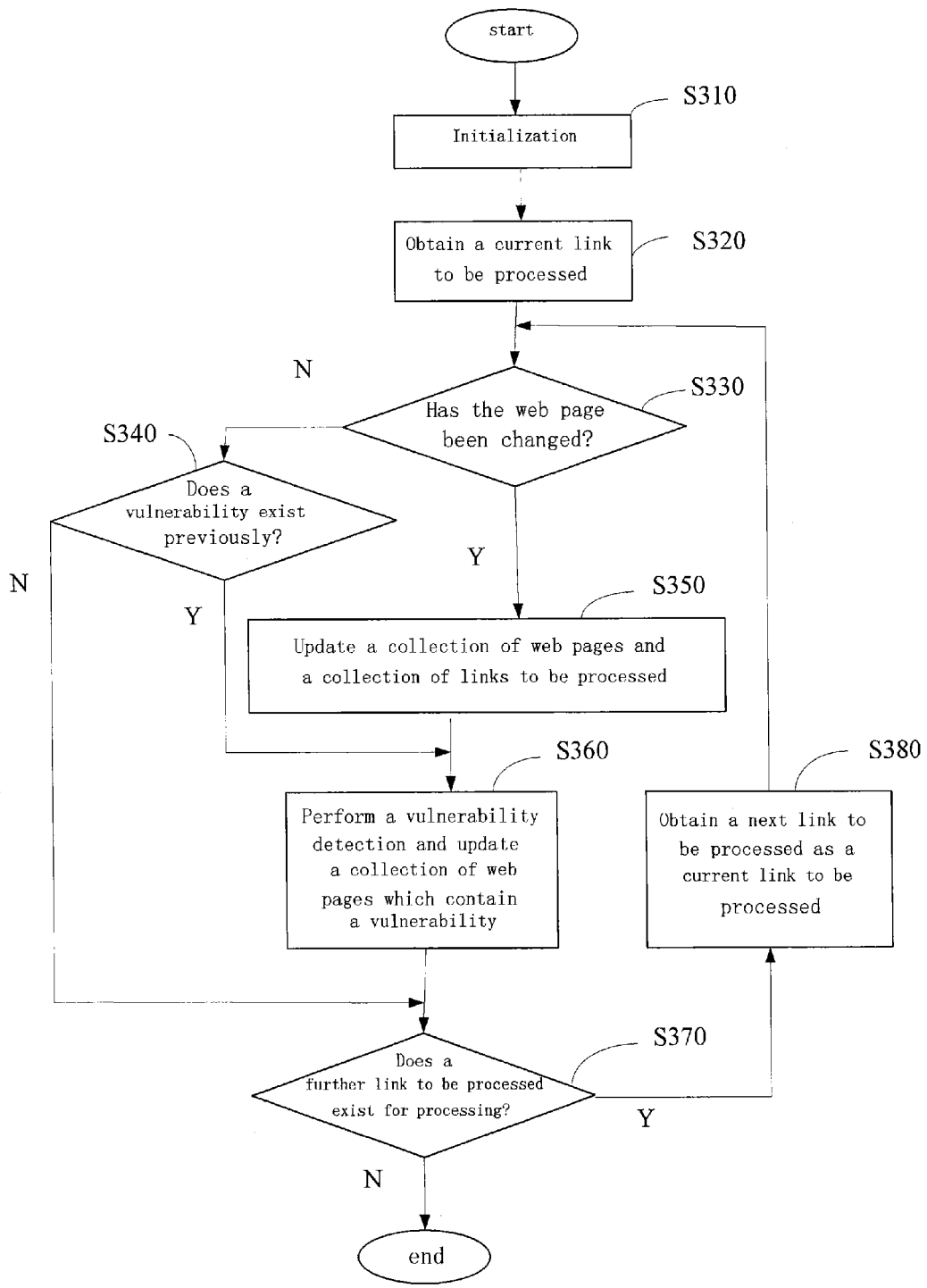
FIG. 3 shows schematically a flow chart of a method for performing an incremental scanning on a target website according to an embodiment of the invention.

FIG. 3 shows schematically a flow chart of a method 300 for performing an incremental scanning on a target website according to an embodiment of the invention. The method 300 is adapted for a scanning performed after an initial full scanning is performed on the target website. As shown in FIG. 3, the method 300 begins at step S310, wherein an initialization is performed. Since it is necessary to perform a scanning on each web page at the target website, the initialization includes creating a collection of links to be processed by utilizing a collection of web pages stored previously for the target website. Of course, the initialization may further include other operations, such as loading a particular feature of the target website, for example, a network application used by the target website and a server type used by the target website, etc.

Subsequently, at step S320, a link is obtained from the collection of links to be processed as a current link to be processed, which may be done by the link processing component 140.

Next, at step S330, it is judged whether a web page corresponding to the link to be processed is identical to the web page scanned previously, namely, whether the web page is a new appeared web page since the last scanning, a web page whose content has been changed, or a web page identical to the original web page. This may be done by the change judgment device 141 in the link processing component 140. The particular processing details are similar to the processing about a new link and/or a changed link given above with reference to the change judgment device 141, and will not be repeated here any more.

Optionally, if it is judged at step S330 that the link to be processed is a new link or a changed link, at step S350, a corresponding web page entry in the collection of web pages is updated (if the link is a new link, then a web page entry corresponding to the link is added into the collection of web pages); furthermore, if in a web page corresponding to the new or changed link is further included links to other web pages, these links to other web pages are utilized to update the collection of links to be processed (namely, a link not existing in the collection of links to be processed is added into the collection of links to be processed), which may be done by the updating device 142. After updating the collection of web pages and the collection of links to be processed, a security vulnerability detection is performed on the link to be processed by step S360.

If it is judged at step S330 that the web page corresponding to the link to be processed has not been changed, at step S340 it is judged whether the web page corresponding to the link to be processed is determined in the last scanning to have contained a vulnerability, i.e., it is judged whether in the collection of web pages which contain a vulnerability exists a web page entry corresponding to the link to be processed, which may be done by the category judgment device 143.

If it is judged at step S340 that the web page corresponding to the link to be processed is determined in the last scanning to have contained a vulnerability, a security vulnerability detection is performed on the link to be processed at step S360.

Step S360 may be performed by the vulnerability detecting component 160 so as to utilize any security vulnerability detecting technology in the art to perform a vulnerability detection on the web page to obtain the result of vulnerability detection, and update the collection of web pages which contain a vulnerability based on the result of vulnerability detection. The particular content of this section is similar to what is described above with reference to the vulnerability detecting component 160, and will not be repeated here any more.

After the above-mentioned processing of the link to be processed, it is judged at step S370 whether there is a further link to be processed for processing in the collection of links to be processed, and if yes, a next link to be processed in the collection of links to be processed is obtained at step S380 as a current link to be processed, and the method returns to step S330 for processing. Otherwise, the incremental scanning method ends.

According to the scanning method of the invention, after a first-time full scanning is performed on the target website, an incremental scanning is performed subsequently based on the result of the first-time full scanning, wherein a full scanning is performed only on a web page whose content has been changed after the last scanning or a new web page, and a full scanning is performed again only on a web page concluded previously to have contained a vulnerability. Therefore, a scanning is not performed again on a normal web page whose content has not been changed any more, thereby improving the performance and speed of the vulnerability scanning.

It is to be noted that, in individual components of the website scanning apparatus 100 of the invention, the components therein are divided logically according to the functions to be realized by them, however, the invention is not limited thereto, and individual components may be re-divided or combined as needed, for example, some components may be combined into a single component, or some components may be further divided into more sub-components.

Embodiments of the individual components of the invention may be implemented in hardware, or in a software module running on one or more processors, or in a combination thereof. It is appreciated by those skilled in the art that, in practice, some or all of the functions of some or all of the components in a website scanning apparatus according to an embodiment of the invention may be realized using a microprocessor or a digital signal processor (DSP). The invention may also be implemented as an apparatus or a device program (e.g., a computer program and a computer program product) for carrying out a part or all of the method described herein. Such a program implementing the invention may be stored on a computer readable medium, or may be in the form of one or more signals. Such a signal may be obtained by downloading it from an Internet website, or provided on a carrier signal, or provided in any other form.

Figure 4:
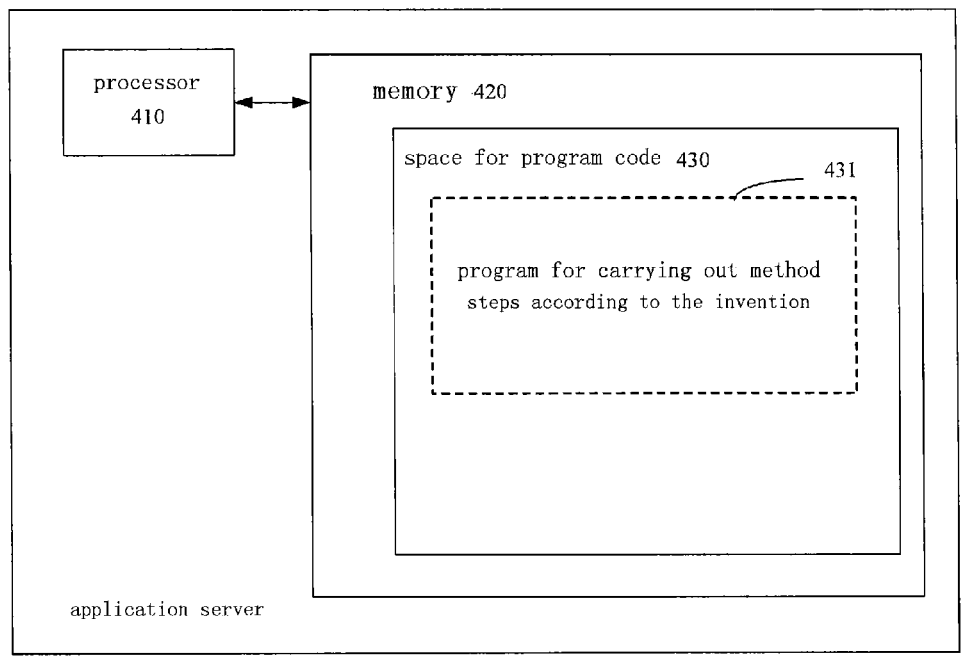
FIG. 4 shows schematically a block diagram of a server for carrying out a method according to the invention.
Figure 5:
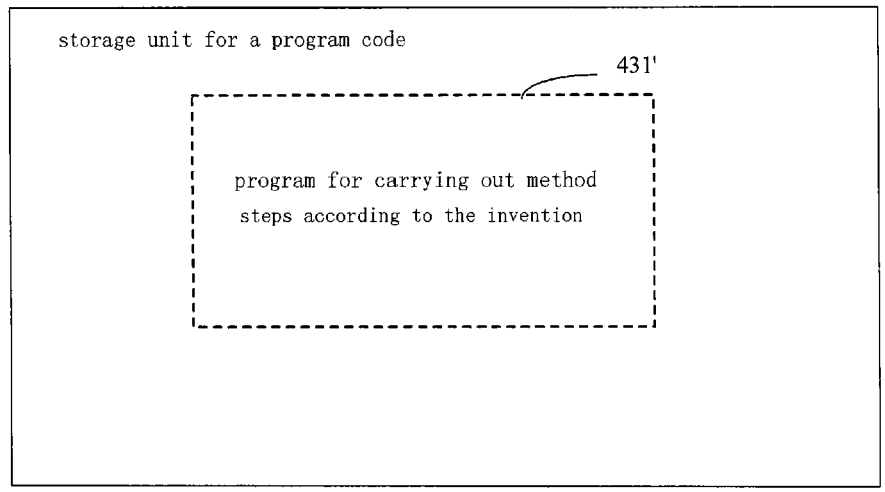
FIG. 5 shows schematically a storage unit for maintaining or carrying a program code implementing a method according to the invention.

For example, FIG. 4 shows a server which may carry out a network scanning method according to the invention, e.g., an application server. The server conventionally includes a processor 410 and a computer program product or a computer readable medium in the form of a memory 420. The memory 420 may be an electronic memory such as a flash memory, an EEPROM (electrically erasable programmable read-only memory), an EPROM, a hard disk or a ROM. The memory 420 has a memory space 430 for a program code 431 for carrying out any method steps of any one of the methods as described above. For example, the memory space 430 for a program code may include individual program codes 431 for carrying out individual steps in the above methods, respectively. These program codes may be read out from or written to one or more computer program products. These computer program products include such a program code carrier as a hard disk, a compact disk (CD), a memory card or a floppy disk. Such a computer program product is generally a portable or stationary storage unit as described with reference to FIG. 5. The storage unit may have a memory segment, a memory space, etc. arranged similarly to the memory 420 in the server of FIG. 4. The program code may for example be compressed in an appropriate form. In general, the storage unit includes computer readable codes 431', i.e., codes which may be read by a processor such as 410, and when run by a server, these codes cause the server to carry out individual steps in the methods described above.

It is to be noted that the above embodiments illustrate rather than limit the invention, and those skilled in the art may design alternative embodiments without departing from the scope of the appended claims. In the claims, any reference sign placed between the parentheses shall not be construed as limiting to a claim. The word "comprise" does not exclude the presence of an element or a step not listed in a claim. The word "a" or "an" preceding an element does not exclude the presence of a plurality of such elements. The invention may be implemented by means of a hardware comprising several distinct elements and by means of a suitably programmed computer. In a unit claim enumerating several devices, several of the devices may be embodied by one and the same hardware item. Use of the words first, second, and third, etc. do not mean any ordering. Such words may be construed as naming.

The invention claimed is:

1. A website scanning apparatus for performing a security vulnerability scanning on a target website, the website scanning apparatus comprising:
   a web page obtaining component for obtaining at least one of current web page content and features of a web page corresponding to a link to be processed at the target website;
   a vulnerability-contained web page memory for storing a collection of web pages which are determined previously to have contained a vulnerability, each web page entry in the collection of web pages comprising a web page link and an associated vulnerability feature;
   a link processing component for processing the link to be processed, wherein the link processing component comprises a change judgment device for judging whether the web page corresponding to the link to be processed has been changed based on stored web page content and features corresponding to the link to be processed as well as at least one of current web page content and features obtained by the web page obtaining component;
   wherein the link processing component further comprises a category judgment device for judging whether the link to be processed is determined previously to have contained a security vulnerability based on the collection of web pages which contain a vulnerability; and
   a vulnerability detecting component for performing a security vulnerability detection on a web page corresponding to a link to be processed for which the corresponding web page is judged by the change judgment device to have been changed and on a web page corresponding to a link to be processed which, as judged by the category judgment device, is determined previously to have contained a security vulnerability;
   a web page memory for storing a collection of web pages at the target website, each web page entry in the collection of web pages comprising at least one of a web page link, web page content, and a web page feature; and
   wherein the change judgment device obtains from the web page memory at least one of the stored web page content and the features corresponding to the link to be processed.

2. The website scanning apparatus as claimed in claim 1, wherein the link processing component comprises:
   an updating device for receiving a link to be processed whose corresponding web page is judged by the change judgment device to have been changed, and utilizing at least one of the current web page content and the features obtained by the web page to update a web page entry in the collection of web pages corresponding to the link to be processed.

3. The website scanning apparatus as claimed in claim 1, wherein the vulnerability detecting component updates the collection of web pages which contain the vulnerability according to a detection result of performing the security vulnerability detection.

4. The website scanning apparatus as claimed in claim 1, wherein the web page feature comprises at least one of a time at which the page is last modified, a page effective time duration, a time at which the page is generated on a server side, a page identification, a page structure, a page content length, and a number of times that the page has been accessed.

5. The website scanning apparatus as claimed in claim 2, comprising:
   a link-to-be-processed memory for storing a collection of links to be processed at the target website;
   wherein the updating device further updates the collection of links to be processed according to links pointing to other web pages in a web page corresponding to the received link to be processed; and
   the link processing component obtains from the link-to-be-processed memory the link to be processed for processing.

6. The website scanning apparatus as claimed in claim 3, wherein the category judgment device receives from the change judgment device a link to be processed for processing whose corresponding web page is judged to have not been changed.

7. A website scanning method for a target website, the method comprising:
- obtaining, by a web page obtaining component, a link to be processed at the target website and at least one of current web pages content and features corresponding to the link to be processed;
- obtaining, by a link processing component, at least one of previous web page content and features of a web page entry corresponding to the link to be processed from a collection of web pages stored for the target website;
- judging, by the link processing component, whether the web page corresponding to the link to be processed has been changed by comparing at least one of the previous web page content and features of the web page entry corresponding to the link to be processed with at least one of the current web page content and the features corresponding to the link to be processed;
- judging, by the link processing component, whether the link to be processed is determined previously to have contained a security vulnerability based on a collection of web pages which contain the security vulnerability, wherein each web page entry in the collection of web pages which contain a vulnerability comprises a web page link and an associated vulnerability feature; and
- performing, by a vulnerability detecting component, a security vulnerability detection on the web page corresponding to the link to be processed if the web page has been changed and on a web page corresponding to the link to be processed which is determined previously to have contained the security vulnerability;
- storing, by a web page memory, a collection of web pages at the target website, each web gage entry in the collection of web pages comprising at least one of a web page link, web page content, and a web page feature; and
- wherein the link processing component obtains from the web page memory at least one of the stored web page content and the features corresponding to the link to be processed.

8. The website scanning method as claimed in claim 7, comprising:
- utilizing, by an updating device, at least one of the current web page content and the features corresponding to the link to be processed to update a corresponding web page entry in the collection of web pages, if the web page corresponding to the link to be processed has been changed.

9. The website scanning method as claimed in claim 7, comprising:
- utilizing, by an updating device, links pointing to other web pages in a web page corresponding to the received link to be processed to update a collection of links to be processed in which the link to be processed is stored, if the web page corresponding to the link to be processed has been changed.

10. The website scanning method as claimed in claim 7, comprising:
- updating, by the vulnerability detecting component, the collection of web pages which contain the security vulnerability according to the detection result of performing the security vulnerability detection.

11. The website scanning method as claimed in claim 7, wherein judging, by a link processing component, whether the link to be processed is determined previously to have contained the security vulnerability is performed only on the link to be processed for which the web page is judged to have been changed by the step of judging whether the web page corresponding to the link to be processed has been changed.

12. The website scanning method as claimed in claim 7, wherein the web page feature comprises at least one of: a time at which the page is last modified, a page effective time duration, a time at which the page is generated on a server side, a page identification, a page structure, a page content length, and a number of times that the page has been accessed.

13. A non-transitory computer readable medium storing thereon a computer program comprising a computer readable code which, when running on a server, causes the server to carry out the website scanning method as claimed in claim 7.

* * * * *